(No Model.)
G. H. NEWTON.
TRIMMING.
No. 505,670. Patented Sept. 26, 1893.
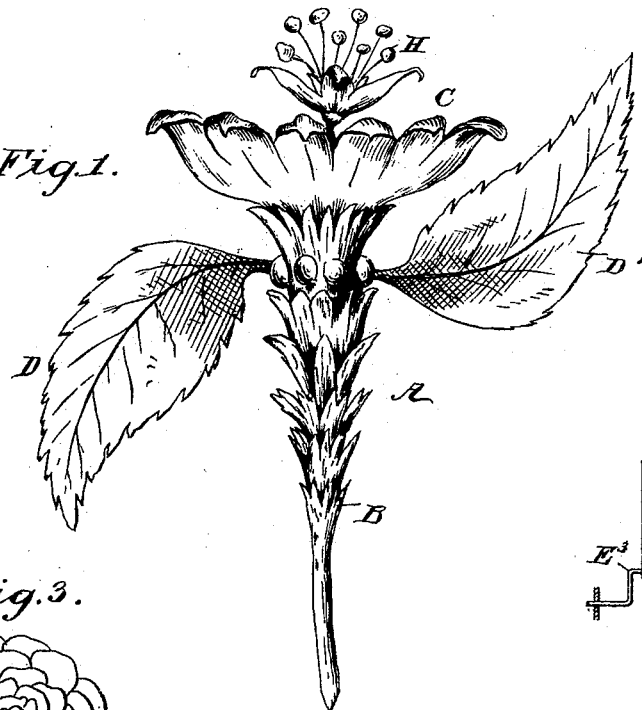
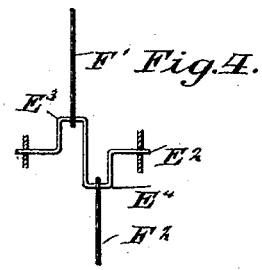
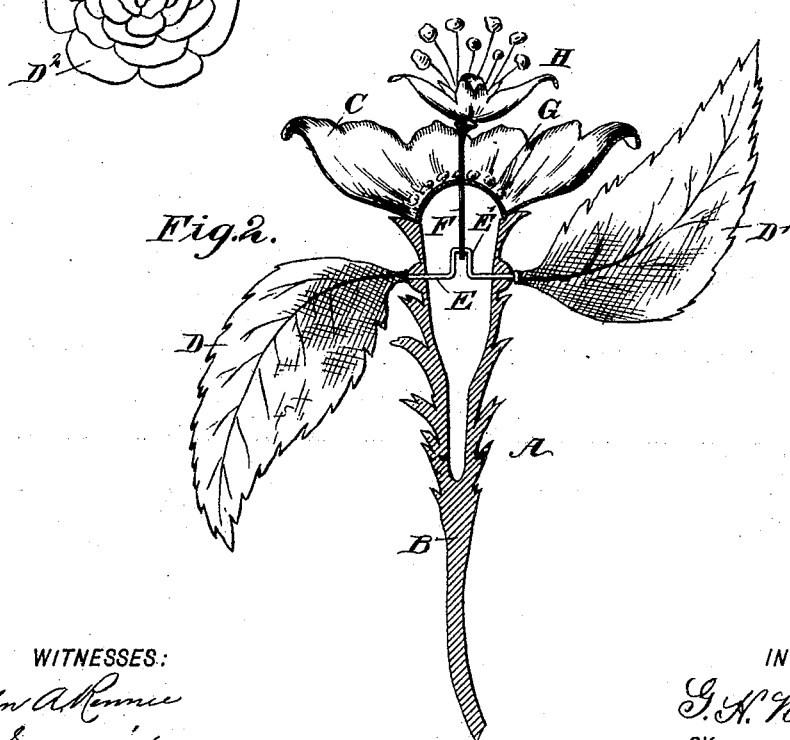
WITNESSES:
John A. Rennie
C. Sedgwick
INVENTOR
G. H. Newton
BY
Munn
ATTORNEYS.

UNITED STATES PATENT OFFICE.

GEORGE H. NEWTON, OF MONSON, MASSACHUSETTS.

TRIMMING.

SPECIFICATION forming part of Letters Patent No. 505,670, dated September 26, 1893.

Application filed April 22, 1893. Serial No. 471,427. (No specimens.)

*To all whom it may concern:*

Be it known that I, GEORGE H. NEWTON, of Monson, in the county of Hampden and State of Massachusetts, have invented a new and Improved Trimming, of which the following is a full, clear, and exact description.

The invention relates to ladies' hat and dress trimmings, and its object is to provide a new and improved trimming, which is very ornamental in appearance and provided with movable parts adapted to be actuated by the wind or outer air, to heighten the novelty of the trimming.

The invention consists of certain parts and details, and combinations of the same, as will be hereinafter described and then pointed out in the claims.

Reference is to be had to the accompanying drawings, forming a part of this specification, in which similar letters of reference indicate corresponding parts in all the figures.

Figure 1 is a side elevation of the improvement. Fig. 2 is a sectional side elevation of the same. Fig. 3 is a face view of a different form of wind wheel, and Fig. 4 is a sectional plan view of a modified form of the driving shaft.

The improved trimming as arranged in the drawings, is formed in the shape of an artificial flower A, having its central stem B, made hollow in its upper part, as shown in Fig. 2, and supporting at the upper end a flower C.

On the sides of the stem B are arranged leaves D and D', constructed in such a manner as to form the blades of a propeller wheel adapted to be actuated by the air blowing or striking the said wheel. The leaves D and D' are secured on the ends of a driving shaft E, arranged in suitable bearings near the upper part of the stem B, the said shaft being provided within the stem with a crank arm E', pivotally-connected with a rod F, mounted to slide in a bearing G, secured within the flower C at the upper end of the stem B, as plainly shown in Fig. 2. This stem F supports stamens H, arranged centrally within the flower C, and adapted to move up and down on rotation of the leaves D, actuated by the air.

As illustrated in Fig. 3, the wind wheel, instead of being composed of oppositely-arranged leaf blades D and D', may be formed in the shape of a rosette $D^2$, the leaves of which are arranged in such a manner that when the rosette is struck by the wind it is caused to rotate, so as to rotate the main driving shaft on which it is secured.

As illustrated in Fig. 4, the main driving shaft $E^2$, may be provided with two crank arms $E^3$ and $E^4$, connected with rods F' and $F^2$, supporting other movable parts of the flower, so that when the shaft is rotated, the several parts of the flower are set in motion.

Now, it will be seen that when this trimming is arranged on a lady's hat or dress, then the action of the wind causes the wind wheel to rotate, so that the main driving shaft is set in motion and movement is given to part of the flower, thus greatly heightening the attractiveness of the trimming.

I do not limit myself to the peculiar and particular shape of the trimming shown in the drawings, as the same may be varied.

Having thus fully described my invention, I claim as new and desire to secure by Letters Patent—

1. In an artificial flower trimming, the combination, with the hollow stem, B, and the part, C, representing the body of a flower, of a crank shaft arranged transversely in said stem, rotating members attached to the ends of said shaft, and the flower center, H, having a rod that connects with the shaft and is reciprocated thereby, substantially as shown and described.

2. An artificial flower trimming, consisting in a stem provided with oppositely extending exposed leaves at its sides a shaft connecting said leaves, a flower surmounting the stem, and having a movable center connected with and operated by said shaft, substantially as set forth.

GEORGE H. NEWTON.

Witnesses:
LOUIS E. CHANDLER,
STEPHEN S. TAFT.